United States Patent
Childress et al.

(10) Patent No.: US 7,270,688 B2
(45) Date of Patent: Sep. 18, 2007

(54) COMPACT FUEL PROCESSOR FOR PRODUCING A HYDROGEN RICH GAS

(75) Inventors: Robert Childress, Forest Hill, MD (US); John R. Farrell, Reisterstown, MD (US); Wendell B. Leimbach, Baltimore, MD (US); James W. Marshall, Phoenix, MD (US)

(73) Assignee: Texaco Inc., San Ramon, CA (US)

( * ) Notice: Subject to any disclaimer, the term of this patent is extended or adjusted under 35 U.S.C. 154(b) by 709 days.

(21) Appl. No.: 10/133,518

(22) Filed: Apr. 26, 2002

(65) Prior Publication Data

US 2003/0051405 A1    Mar. 20, 2003

Related U.S. Application Data

(60) Provisional application No. 60/286,684, filed on Apr. 26, 2001.

(51) Int. Cl.
*B01J 7/00* (2006.01)
(52) U.S. Cl. ............... 48/61; 48/197; 48/198; 48/199; 48/127; 422/119; 422/120; 422/187; 422/188; 422/190; 422/191; 422/189; 429/12; 429/13; 429/17
(58) Field of Classification Search ........ 422/119, 422/120, 187–191; 48/197–199, 127; 429/12, 429/13, 17
See application file for complete search history.

(56) References Cited

U.S. PATENT DOCUMENTS

| | | | | |
|---|---|---|---|---|
| 4,356,804 A | * | 11/1982 | Igashira et al. ........... 123/549 |
| 5,932,181 A | * | 8/1999 | Kim et al. ................. 422/188 |
| 6,159,434 A | * | 12/2000 | Gonjo et al. ............... 422/191 |
| 6,497,856 B1 | * | 12/2002 | Lomax, Jr. et al. ........ 423/651 |
| 6,641,625 B1 | * | 11/2003 | Clawson et al. .......... 48/127.9 |
| 2001/0045061 A1 | * | 11/2001 | Edlund et al. ................ 48/76 |
| 2002/0090326 A1 | * | 7/2002 | Deshpande ................ 422/190 |
| 2002/0131919 A1 | * | 9/2002 | DeBellis et al. ........... 422/188 |

* cited by examiner

*Primary Examiner*—Glenn Caldarola
*Assistant Examiner*—Vinit H. Patel
(74) *Attorney, Agent, or Firm*—Howrey L.L.P.; Frank C. Turner; Melissa Patangia

(57) ABSTRACT

An apparatus for carrying out a multi-step process of converting hydrocarbon fuel to a substantially pure hydrogen gas feed includes a plurality of modules stacked end-to-end along a common axis. Each module includes a shell having an interior space defining a passageway for the flow of gas from a first end of the shell to a second end of the shell opposite the first end, and a processing core being contained within the interior space for effecting a chemical, thermal, or physical change to a gas stream passing axially through the module. The multi-step process includes: providing a fuel processor having a plurality of modules stacked end-to-end along a common axis; and feeding the hydrocarbon fuel successively through each of the modules in an axial direction through the tubular reactor to produce the hydrogen rich gas.

14 Claims, 5 Drawing Sheets ary with claiming priority to US 7,270,688 B2.

COMPACT FUEL PROCESSOR FOR PRODUCING A HYDROGEN RICH GAS

Priority of U.S. Provisional Patent Application No. 60/286,684, filed Apr. 26, 2001 is claimed under 35 U.S.C. §119.

BACKGROUND OF THE INVENTION

Fuel cells provide electricity from chemical oxidation-reduction reactions and possess significant advantages over other forms of power generation in terms of cleanliness and efficiency. Typically, fuel cells employ hydrogen as the fuel and oxygen as the oxidizing agent. The power generation is proportional to the consumption rate of the reactants.

A significant disadvantage which inhibits the wider use of fuel cells is the lack of a widespread hydrogen infrastructure. Hydrogen has a relatively low volumetric energy density and is more difficult to store and transport than the hydrocarbon fuels currently used in most power generation systems. One way to overcome this difficulty is the use of reformers to convert the hydrocarbons to a hydrogen rich gas stream which can be used as a feed for fuel cells.

Hydrocarbon-based fuels, such as natural gas, LPG, gasoline, and diesel, require conversion processes to be used as fuel sources for most fuel cells. Current art uses multi-step processes combining an initial conversion process with several clean-up processes. The initial process is most often steam reforming (SR), autothermal reforming (ATR), catalytic partial oxidation (CPOX), or non-catalytic partial oxidation (POX). The clean-up processes usually include of a combination of desulfurization, high temperature water-gas shift, low temperature water-gas shift, selective CO oxidation, or selective CO methanation. Alternative processes include hydrogen selective membrane reactors and filters.

Despite the above work, there remains a need for a simple unit for converting a hydrocarbon fuel to a hydrogen rich gas stream for use in conjunction with a fuel cell.

SUMMARY OF THE INVENTION

The present invention is generally directed to an apparatus and method for converting hydrocarbon fuel into a hydrogen rich gas. One such illustrative embodiment includes an apparatus for converting hydrocarbon fuel into a hydrogen rich gas, including a plurality of modules stacked end-to-end along a common axis, wherein each module comprises a shell having an interior space defining a passageway for the flow of a gas stream from a first end of the shell to a second end of the shell opposite the first end, and a processing core contained within the interior space for effecting a chemical, thermal, or physical change to the gas stream passing axially therethrough.

In this illustrative embodiment, the plurality of modules includes a first module including an autothermal or steam reforming catalyst bed, a second module positioned adjacent to the first module including a first heat exchanger, a third module positioned adjacent to the second module including a desulfurization catalyst bed (preferably zinc oxide), a fourth module positioned adjacent to the third module including a water gas shift catalyst bed, a fifth module positioned adjacent to the fourth module including a second heat exchanger, and a sixth module positioned adjacent to the fifth module including a preferential oxidation catalyst bed.

It is also an aspect of this fuel processor to include a manifold positioned adjacent to the sixth module, wherein the manifold recovers the hydrogen rich gas from the sixth module and distributes coolant to and collects coolant from the second, fourth, and fifth modules. It is a preferred aspect of this illustrative embodiment that the processing core for each module is enclosed by ceramic casting for insulation. Furthermore, it is a preferred embodiment that a third heat exchanger is positioned within the water gas shift catalyst bed in order to adequately control the shift reaction temperature.

Another such illustrative embodiment includes an apparatus for converting hydrocarbon fuel into a hydrogen rich gas, including a container having a feed end and a product end, and a plurality of modules stacked end-to-end along a common axis with the plurality of modules being enclosed within the container. Each module including a shell having an interior space defining a passageway for the flow of a gas stream from a first end of the shell to a second end of the shell opposite the first end, and a processing core contained within the interior space for effecting a chemical, thermal, or physical change to the gas stream passing axially therethrough.

In this illustrative embodiment, the plurality of modules includes a first module comprising an autothermal or steam reforming catalyst bed, a second module positioned adjacent to the first module including a first heat exchanger, a third module positioned adjacent to the second module including a desulfurization catalyst bed (preferably zinc oxide), a fourth module positioned adjacent to the third module comprising a water gas shift catalyst bed, a fifth module positioned adjacent to the fourth module including a second heat exchanger, and a sixth module positioned adjacent to the fifth module including a preferential oxidation catalyst bed.

It is a preferred aspect of this illustrative embodiment that the container includes a first portion and a second portion, wherein the first portion is connected to a first set of modules and the second portion is connected to a second set of modules, wherein the first portion and the second portion of the container are separable, thereby permitting either set of modules to be serviced independently.

BRIEF DESCRIPTION OF THE DRAWINGS

The description is presented with reference to the accompanying drawings in which.

DESCRIPTION OF ILLUSTRATIVE EMBODIMENTS

The present invention is generally directed to an apparatus for converting hydrocarbon fuel into a hydrogen rich gas. In a preferred aspect, the apparatus and method described herein relate to a compact processor for producing a hydrogen rich gas stream from a hydrocarbon fuel for use in fuel cells. However, other possible uses are contemplated for the apparatus and method described herein, including any use wherein a hydrogen rich stream is desired. Accordingly, while the invention is described herein as being used in conjunction with a fuel cell, the scope of the invention is not limited to such use.

Each of the illustrative embodiments of the present invention describes a fuel processor or a process for using such a fuel processor with the hydrocarbon fuel feed being directed through the fuel processor. The hydrocarbon fuel may be liquid or gas at ambient conditions as long as it can be vaporized. As used herein the term "hydrocarbon" includes organic compounds having C—H bonds which are capable of producing hydrogen via a partial oxidation or steam reforming reaction. The presence of atoms other than carbon and hydrogen in the molecular structure of the compound is not excluded. Thus, suitable fuels for use in the method and apparatus disclosed herein include, but are not limited to, hydrocarbon fuels such as natural gas, methane, ethane, propane, butane, naphtha, gasoline, and diesel fuel, and alcohols such as methanol, ethanol, propanol, and the like.

The fuel processor feeds include hydrocarbon fuel, oxygen, and water. The oxygen can be in the form of air, enriched air, or substantially pure oxygen. The water can be introduced as a liquid or vapor. The composition percentages of the feed components are determined by the desired operating conditions, as discussed below.

The fuel processor effluent stream from of the present invention includes hydrogen and carbon dioxide and can also include some water, unconverted hydrocarbons, carbon monoxide, impurities (e.g. hydrogen sulfide and ammonia) and inert components (e.g., nitrogen and argon, especially if air was a component of the feed stream).

Figure 1:
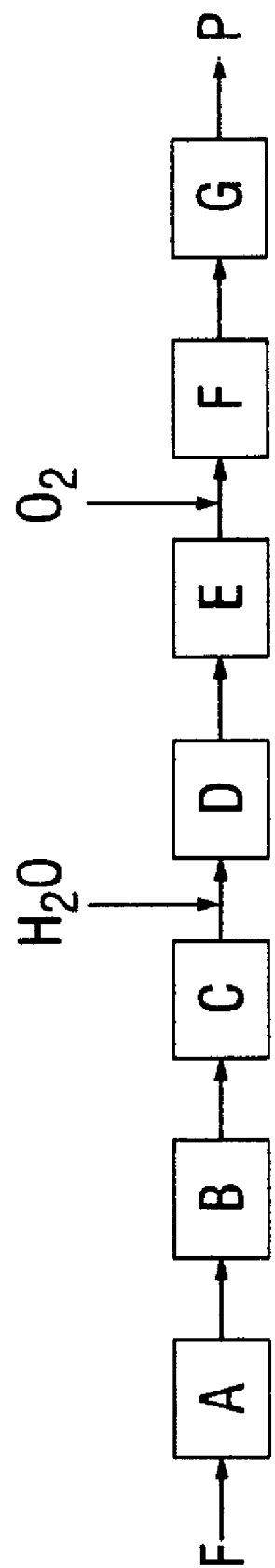
FIG. 1 depicts a simple process flow diagram for one illustrative embodiment of the present invention.

FIG. 1 depicts a general process flow diagram illustrating the process steps included in the illustrative embodiments of the present invention. One of skill in the art should appreciate that a certain amount of progressive order is needed in the flow of the reactants through the reactors disclosed herein.

Process step A is an autothermal reforming process in which two reactions, partial oxidation (formula I, below) and optionally also steam reforming (formula II, below), are combined to convert the feed stream F into a synthesis gas containing hydrogen and carbon monoxide. Formulas I and II are exemplary reaction formulas wherein methane is considered as the hydrocarbon:

$$CH_4 + \tfrac{1}{2}O_2 \rightarrow 2H_2 + CO \quad (I)$$

$$CH_4 + H_2O \rightarrow 3H_2 + CO \quad (II)$$

The partial oxidation reaction occurs very quickly to the complete conversion of oxygen added and produces heat. The steam reforming reaction occurs slower and consumes heat. A higher concentration of oxygen in the feed stream favors partial oxidation whereas a higher concentration of water vapor favors steam reforming. Therefore, the ratios of oxygen to hydrocarbon and water to hydrocarbon become characterizing parameters. These ratios affect the operating temperature and hydrogen yield.

The operating temperature of the autothermal reforming step can range from about 550° C. to about 900° C., depending on the feed conditions and the catalyst. The invention uses a catalyst bed of a partial oxidation catalyst with or without a steam reforming catalyst. The catalyst may be in any form including pellets, spheres, extrudates, monoliths, and the like. Partial oxidation catalysts should be well known to those with skill in the art and often contain noble metals such as platinum, palladium, rhodium, and/or ruthenium on an alumina washcoat on a monolith, extrudate, pellet or other support. Non-noble metals such as nickel or cobalt have been used. Other washcoats such as titania, zirconia, silica, and magnesia have been cited in the literature. Many additional materials such as lanthanum, cerium, and potassium have been cited in the literature as "promoters" that improve the performance of the partial oxidation catalyst.

Steam reforming catalysts should be known to those with skill in the art and can include nickel with amounts of cobalt or a noble metal such as platinum, palladium, rhodium, ruthenium, and/or iridium. The catalyst can be supported, for example, on magnesia, alumina, silica, zirconia, or magnesium aluminate, singly or in combination. Alternatively, the steam reforming catalyst can include nickel, preferably supported on magnesia, alumina, silica, zirconia, or magnesium aluminate, singly or in combination, promoted by an alkali metal such as potassium.

Process step B is a cooling step for cooling the synthesis gas stream from process step A to a temperature of from about 200° C. to about 600° C., preferably from about 300° C. to about 500° C., and more preferably from about 375° C. to about 425° C., to optimize the temperature of the synthesis gas effluent for the next step. This cooling may be achieved with heat sinks, heat pipes or heat exchangers depending upon the design specifications and the need to recover/recycle the heat content of the gas stream. One illustrative embodiment for step B is the use of a heat exchanger utilizing feed stream F as the coolant circulated through the heat exchanger. The heat exchanger can be of any suitable construction known to those with skill in the art including shell and tube, plate, spiral, etc. Alternatively, or in addition thereto, cooling step B may be accomplished by injecting additional feed components such as fuel, air or water. Water is preferred because of its ability to absorb a large amount of heat as it is vaporized to steam. The amounts of added components depend upon the degree of cooling desired and are readily determined by those with skill in the art.

Process step C is a purifying step. One of the main impurities of the hydrocarbon stream is typically sulfur, which is converted by the autothermal reforming step A to hydrogen sulfide. The processing core used in process step C preferably includes zinc oxide and/or other material capable of absorbing and converting hydrogen sulfide, and may include a support (e.g., monolith, extrudate, pellet etc.). Desulfurization is accomplished by converting the hydrogen sulfide to water in accordance with the following reaction formula III:

$$H_2S + ZnO \rightarrow H_2O + ZnS \quad (III)$$

Other impurities such as chlorides can also be removed. The reaction is preferably carried out at a temperature of from about 300° C. to about 500° C., and more preferably from about 375° C. to about 425° C. Zinc oxide is an effective hydrogen sulfide absorbent over a wide range of temperatures from about 25° C. to about 700° C. and affords great flexibility for optimizing the sequence of processing steps by appropriate selection of operating temperature.

The effluent stream may then be sent to a mixing step D in which water is optionally added to the gas stream. The addition of water lowers the temperature of the reactant stream as it vaporizes and supplies more water for the water gas shift reaction of process step E (discussed below). The water vapor and other effluent stream components are mixed by being passed through a processing core of inert materials such as ceramic beads or other similar materials that effectively mix and/or assist in the vaporization of the water.

Alternatively, any additional water can be introduced with feed, and the mixing step can be repositioned to provide better mixing of the oxidant gas in the CO oxidation step G disclosed below.

Process step E is a water gas shift reaction that converts carbon monoxide to carbon dioxide in accordance with formula IV:

$$H_2O + CO \rightarrow H_2 + CO_2 \qquad (IV)$$

This is an important step because carbon monoxide, in addition to being highly toxic to humans, is a poison to fuel cells. The concentration of carbon monoxide should preferably be lowered to a level that can be tolerated by fuel cells, typically below 50 ppm. Generally, the water gas shift reaction can take place at temperatures of from 150° C. to 600° C. depending on the catalyst used. Under such conditions, most of the carbon monoxide in the gas stream is converted in this step.

Low temperature shift catalysts operate at a range of from about 150° C. to about 300° C. and include, for example, copper oxide, or copper supported on other transition metal oxides such as zirconia, zinc supported on transition metal oxides or refractory supports such as silica, alumina, zirconia, etc., or a noble metal such as platinum, rhenium, palladium, rhodium or gold on a suitable support such as silica, alumina, zirconia, and the like.

High temperature shift catalysts are preferably operated at temperatures ranging from about 300° to about 600° C. and can include transition metal oxides such as ferric oxide or chromic oxide, and optionally include a promoter such as copper or iron silicide. Also included, as high temperature shift catalysts are supported noble metals such as supported platinum, palladium and/or other platinum group members.

The processing core utilized to carry out this step can include a packed bed of high temperature or low temperature shift catalyst such as described above, or a combination of both high temperature and low temperature shift catalysts. The process should be operated at any temperature suitable for the water gas shift reaction, preferably at a temperature of from 150° C. to about 400° C. depending on the type of catalyst used. Optionally, a cooling element such as a cooling coil may be disposed in the processing core of the shift reactor to lower the reaction temperature within the packed bed of catalyst. Lower temperatures favor the conversion of carbon monoxide to carbon dioxide. Also, a purification processing step C can be performed between high and low shift conversions by providing separate steps for high temperature and low temperature shift with a desulfurization module between the high and low temperature shift steps.

Process step F is a cooling step performed in one embodiment by a heat exchanger. The heat exchanger can be of any suitable construction including shell and tube, plate, spiral, etc. Alternatively a heat pipe or other form of heat sink may be utilized. The goal of the heat exchanger is to reduce the temperature of the gas stream to produce an effluent having a temperature preferably in the range of from about 90° C. to about 150° C.

Oxygen is added to the process in step F. The oxygen is consumed by the reactions of process step G described below. The oxygen can be in the form of air, enriched air, or substantially pure oxygen. The heat exchanger may by design provide mixing of the air with the hydrogen rich gas. Alternatively, the embodiment of process step D may be used to perform the mixing.

Process step G is an oxidation step wherein almost all of the remaining carbon monoxide in the effluent stream is converted to carbon dioxide. The processing is carried out in the presence of a catalyst for the oxidation of carbon monoxide and may be in any suitable form, such as pellets, spheres, monolith, etc. Oxidation catalysts for carbon monoxide are known and typically include noble metals (e.g., platinum, palladium) and/or transition metals (e.g., iron, chromium, manganese), and/or compounds of noble or transition metals, particularly oxides. A preferred oxidation catalyst is platinum on an alumina washcoat. The washcoat may be applied to a monolith, extrudate, pellet or other support. Additional materials such as cerium or lanthanum may be added to improve performance. Many other formulations have been cited in the literature with some practitioners claiming superior performance from rhodium or alumina catalysts. Ruthenium, palladium, gold, and other materials have been cited in the literature as being active for this use.

Two reactions occur in process step G: the desired oxidation of carbon monoxide (formula V) and the undesired oxidation of hydrogen (formula VI) as follows:

$$CO + \tfrac{1}{2}O_2 \rightarrow CO_2 \qquad (V)$$

$$H_2 + \tfrac{1}{2}O_2 \rightarrow H_2O \qquad (VI)$$

The preferential oxidation of carbon monoxide is favored by low temperatures. Since both reactions produce heat it may be advantageous to optionally include a cooling element such as a cooling coil disposed within the process. The operating temperature of process is preferably kept in the range of from about 90° C. to about 150° C. Process step G preferably reduces the carbon monoxide level to less than 50 ppm, which is a suitable level for use in fuel cells, but one of skill in the art should appreciate that the present invention can be adapted to produce a hydrogen rich product with of higher and lower levels of carbon monoxide.

The effluent exiting the fuel processor is a hydrogen rich gas containing carbon dioxide and other constituents which may be present such as water, inert components (e.g., nitrogen, argon), residual hydrocarbon, etc. Product gas may be used as the feed for a fuel cell or for other applications where a hydrogen rich feed stream is desired. Optionally, product gas may be sent on to further processing, for example, to remove the carbon dioxide, water or other components.

Figure 2:
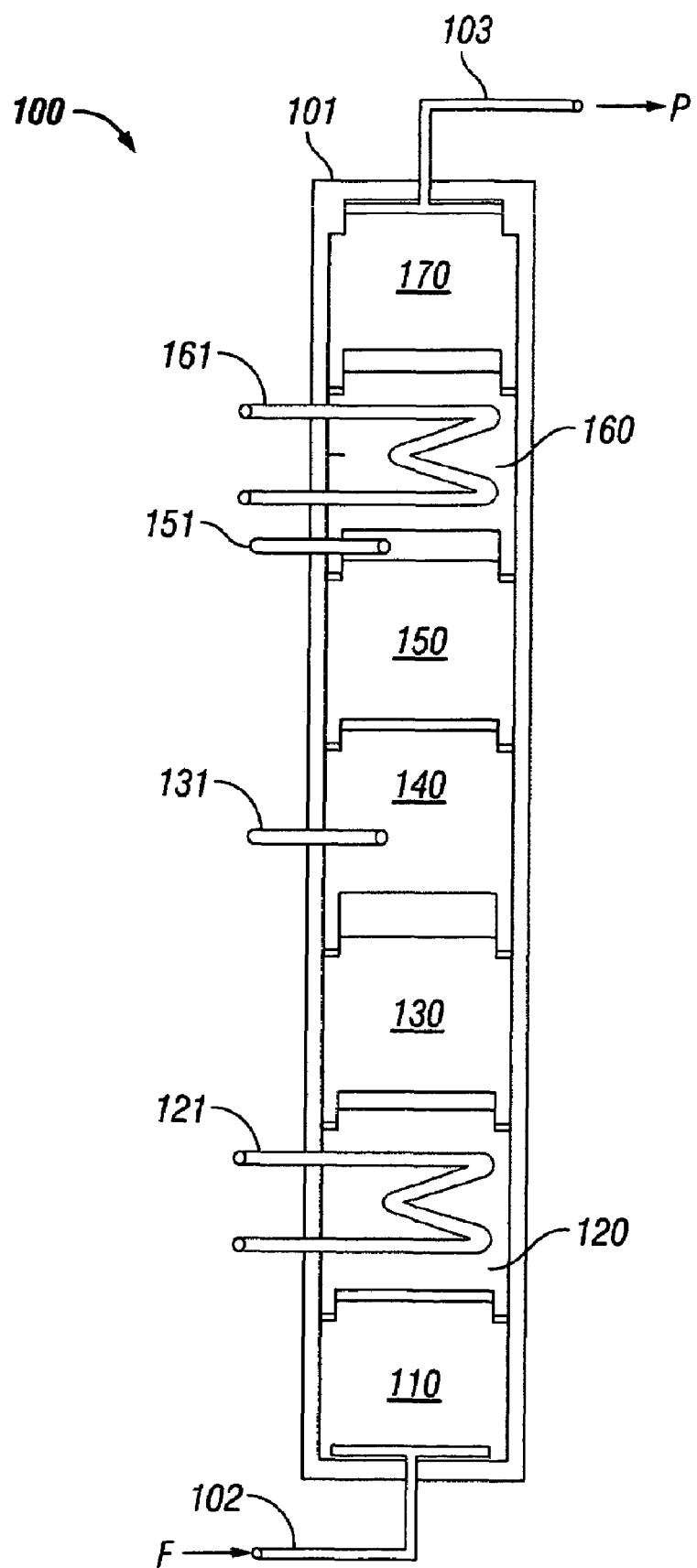
FIG. 2 illustrates one illustrative embodiment of the compact fuel processor apparatus of the present invention.

In one illustrative embodiment of the present invention, the fuel processor is of modular construction with individual modular units, which are separable, rearrangeable, and individually replaceable. Referring to FIG. 2, the fuel processor 100 of the present invention includes a series of individual modules (110, 120, 130, 140, 150, 160 and 170). The modular units may be used in any orientation, e.g., vertical or horizontal orientation, and is adapted to be used in conjunction with a fuel cell such that the hydrogen rich product gas of the reactor described herein is supplied directly to a fuel cell as a feed stream. While the modules can have any cross sectional configuration, such as circular, rectangular, triangular, etc., a circular cross section is preferred with the fuel processor 100 being of a generally tubular shape.

The modules can be fabricated from any material capable of withstanding the operating conditions and chemical environment of the reactions described herein and can include, for example, stainless steel, Inconel, Incoloy, Hastelloy, and the like. The reaction pressure is preferable from about 0 to about 100 psig, although higher pressures may be employed.

The operating pressure of the fuel processor depends upon the delivery pressure required by the fuel cell. For fuel cells operating in the 1 to 20 kW range an operating pressure of 0 to about 100 psig is generally sufficient. The modules are of such dimensions so as to safely contain the reaction at the desired operating pressures and temperatures.

Fuel processor 100 as shown in FIG. 2 effects the process diagrammatically illustrated in FIG. 1. Feed stream F is introduced through inlet pipe 102 and product gas P is drawn off via outlet pipe 103. The apparatus 100 includes several modules that may be stacked to form a modular assembly that can be modified by the replacement of individual modules. Each module performs a separate operational function and is generally configured as shown in FIG. 2. Module 110 is the autothermal reforming module corresponding to process step A of FIG. 1. Module 120 is a cooling step corresponding to process step B of FIG. 1. In this illustrative embodiment, heat exchanger 121 is shown as a general heat sink for Module 120. Module 130 is a purifying module corresponding to process step C of FIG. 1. Module 140 is an optional mixing step corresponding to process step D of FIG. 1. Feed nozzle 131 provides an optional water stream feed to Module 140 to aid in driving the water gas shift reaction (Equation IV) of Module 150. Module 150 is a water gas shift module corresponding to process step E of FIG. 1. Feed nozzle 151 provides a source for oxygen to process gas for the oxidation reaction (Equation V) of Module 170. Module 150 also contains a heat exchanger (not shown) positioned within or surrounding the catalyst bed so as to maintain a desired water gas shift reaction temperature. Module 160 is a cooling step corresponding to process step F of FIG. 1. In this illustrative embodiment, heat exchanger 161 is shown as a general heat sink for Module 160. Module 170 is an oxidation step corresponding to process step G of FIG. 1. Module 170 also contains a heat exchanger (not shown) positioned within or surrounding the catalyst bed so as to maintain a desired oxidation reaction temperature. One of skill in the art should appreciate that the process configuration described in this embodiment may vary depending on numerous factors, including but not limited to feedstock quality and required product quality.

Figure 3:
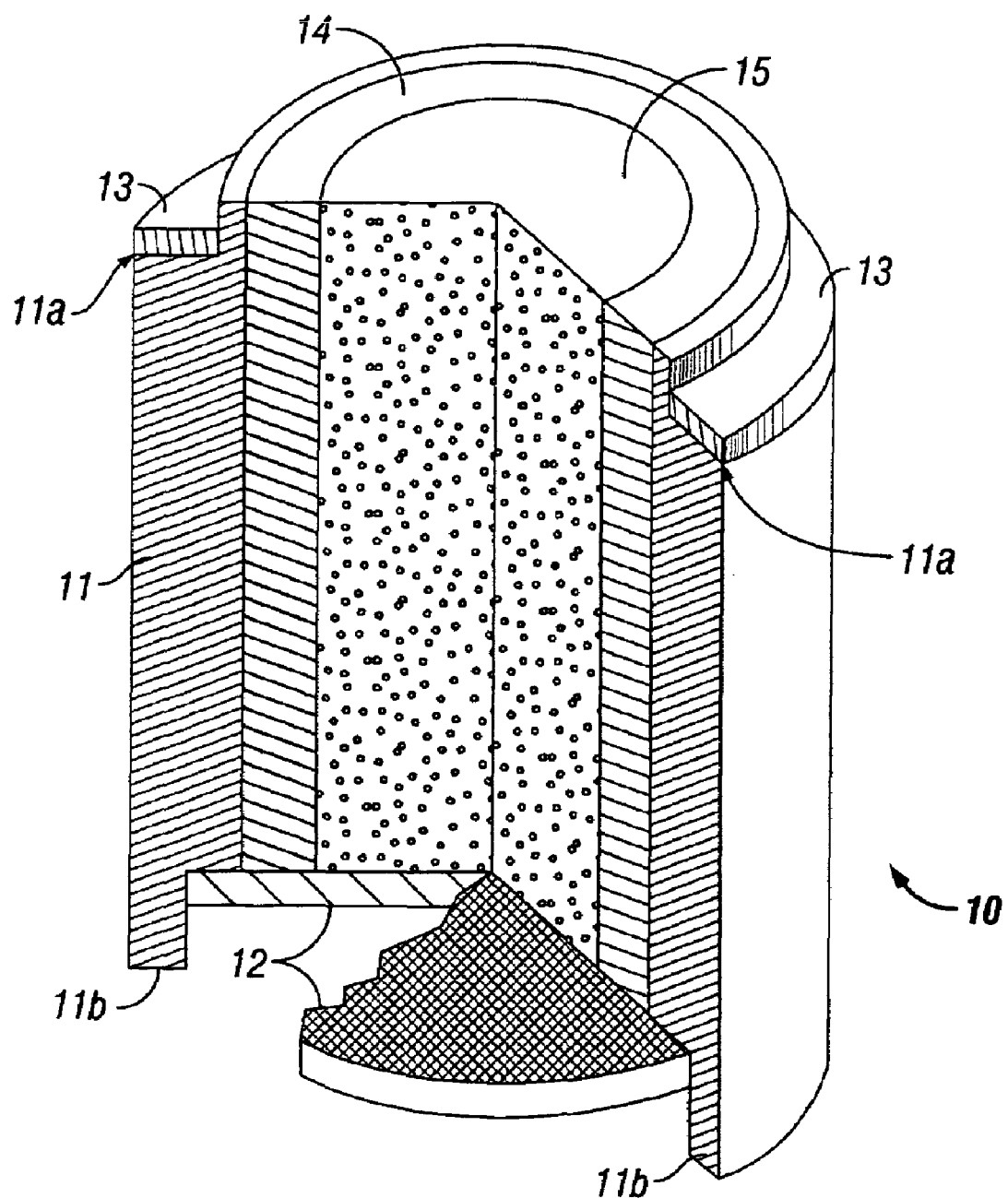
FIG. 3 is a cutaway partly sectional perspective view of one embodiment of a module.

FIG. 3 illustrates one embodiment of an individual module 10 that includes a shell 11, an optional support plate 12, an annular gasket 13, an optional insulative material 14, and a processing core 15. Shell 11 can have any cross sectional shape such as circular, square, triangular, etc. However shell 11 is preferably a cylindrical shaped tubular member having an axial bore. Shell 11 is preferably fabricated from a material such as stainless steel, Inconel, Incoloy, or Hastelloy for the reasons stated above. Shell 11 includes an annular upper recess 11a and an annular lower lip 11b, which serve as mating features to facilitate the stacking of two or more modules. The upper recess 11a is adapted to receive gasket 13 and lower lip 11b.

The optional support plate 12 is preferably fabricated from, for example, a screen, mesh, perforated plate, porous sintered metal plate, and the like. It can be fabricated from metal alloys such as stainless steel, Inconel, Incoloy, or Hastelloy, or from a suitable ceramic material. The support plate 12 not only provides support for the components contained within the module 10, it also serves as a gas distributor to distribute the gas flow though the reactor evenly throughout the cross section of the reactor. Even distribution of the gas facilitates optimal performance of the reactor.

Gasket 13 is a ring shaped piece to help seal the joint between modules and prevent gas leaks. It can be fabricated from materials such as graphite, ceramic, copper, or other materials capable of withstanding the operating conditions of the reactor.

Optional internal insulator 14 is disposed within the axial bore of cylindrical shell 11 and comprises a cylindrical piece with an axial bore. Insulator 14 minimizes heat loss to the environment that could reduce the system efficiency. It shortens start-up time and reduces heat transfer to the shell 11 and the environment. Internal insulator 14 can be fabricated from any material suitable for the purposes described herein. Preferred materials include interam intumescent fibrous ceramic mat; saffil alumina fibrous mat; flexible, knitted steel wire mat (such as Wire Wrap); and other flexible ceramic mats made from alumina or silica fibers and similar such materials.

Processing core 15 is contained within the axial bore of shell 11, and, if the internal insulator 14 is present, also within the bore of the internal insulator. Processing core 15 accomplishes the function of the module and can be a catalyst, adsorbent, absorbent, heat exchanger, or inert material.

Figure 4:
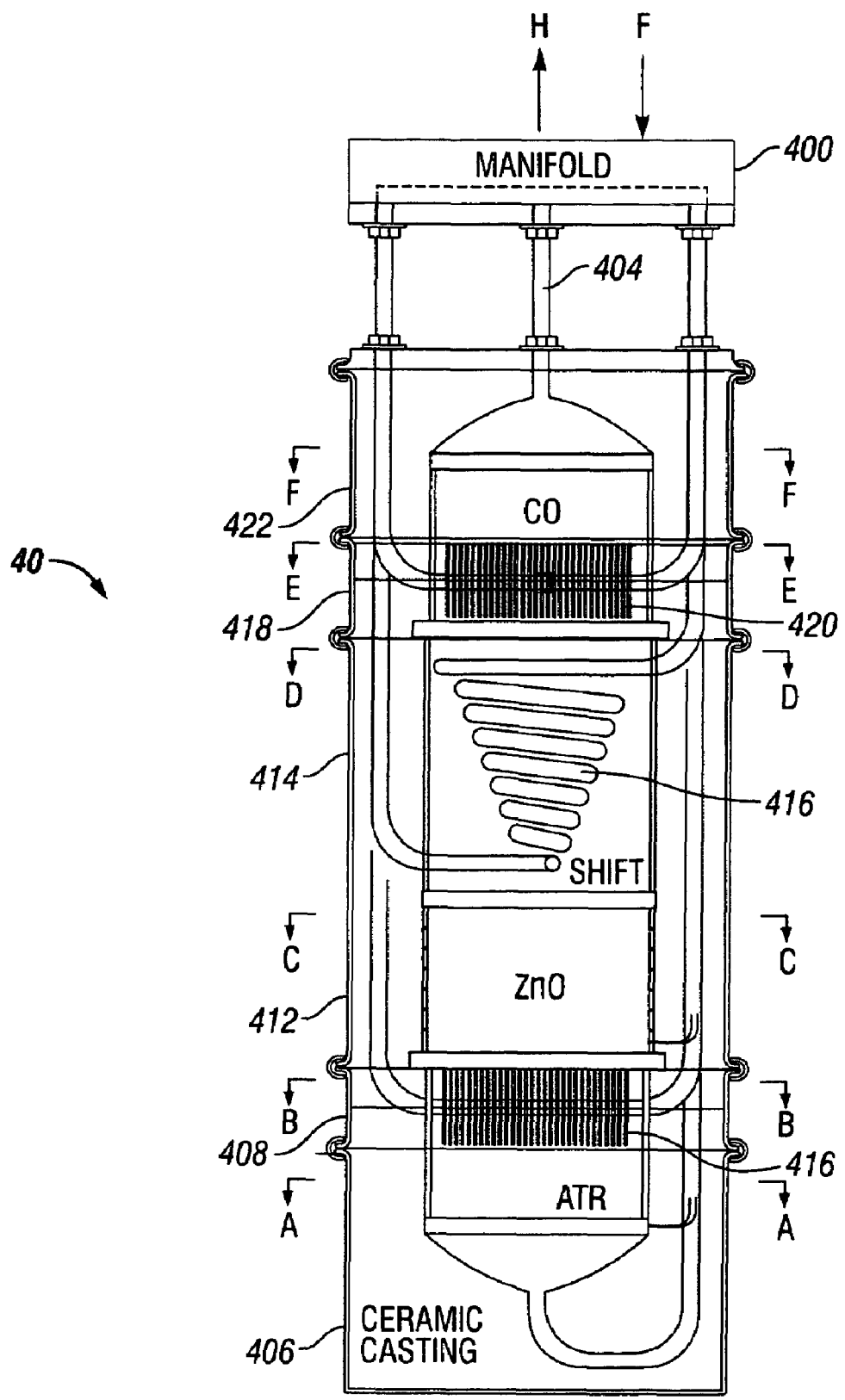
FIG. 4 shows another illustrative embodiment of the compact fuel processor apparatus of the present invention.

FIG. 4 illustrates one embodiment of the present invention. Hydrocarbon fuel feed stream F is introduced into the fuel processor through manifold 400, where it is diverted via a feed pipe to the first module. Hydrogen rich gas H is also drawn off from manifold 400 via product pipe 404. The apparatus 40 includes several modules that may be stacked to form a modular assembly that can be modified by the replacement of individual modules. Each module in FIG. 4 performs a separate operational function and is configured similar to the embodiment shown in FIG. 2. Additionally, each of the processing cores in FIG. 4 is enclosed by a ceramic casting that is used for insulation purposes. Module 406 is the autothermal/steam reforming module corresponding to process step A of FIG. 1. Module 408 is a heat exchanger corresponding to process step B of FIG. 1. In this illustrative embodiment, heat exchanger 410 is shown as a diffusion bonded heat exchanger, although any type of heat exchanger is envisioned for the present invention. Module 412 is a purifying module corresponding to process step C of FIG. 1. Module 414 contains a water gas shift catalyst bed corresponding to process step E of FIG. 1. Module 414 also contains heat exchanger 416 positioned within the catalyst bed so as to maintain a desired water gas shift reaction temperature. In this illustrative embodiment, heat exchanger 416 is shown as a cooling coil, although any type of heat exchanger positioned within or surrounding the water gas shift catalyst bed is envisioned for the present invention. Module 418 is a heat exchanger module corresponding to process step F of FIG. 1. In this illustrative embodiment, heat exchanger 420 is shown as a diffusion bonded heat exchanger, although any type of heat exchanger is envisioned for the present invention. Module 422 is an oxidation step corresponding to process step G of FIG. 1. Manifold 400 is a preferred aspect of the present invention as it provides adequate distribution and collection of coolant streams, as well as the feed and product streams. Although not shown in FIG. 4, it is a preferred embodiment to vary the diameter of the processing core for each module, adjusting the relative size of each unit according to the gas flow parameters and the reactivity of the catalyst, the residence time of the gas, the reaction kinetics and thermodynamics, and the like. One of skill in the art should also appreciate that the process configuration described in this embodiment may vary depending on numerous factors, including but not limited to feedstock quality and required product quality.

Figure 5A:
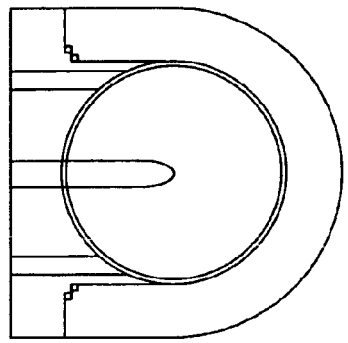
FIG. 5 depicts the severability of one illustrative embodiment of the compact fuel processor of the current invention.
Figure 5B:
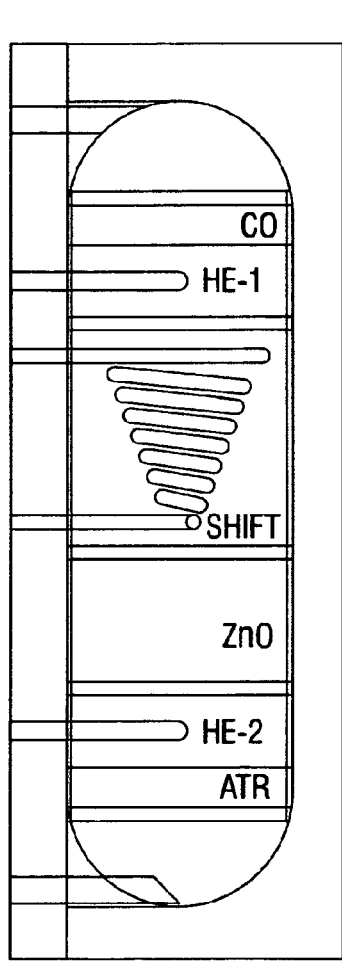
Figure 5C:
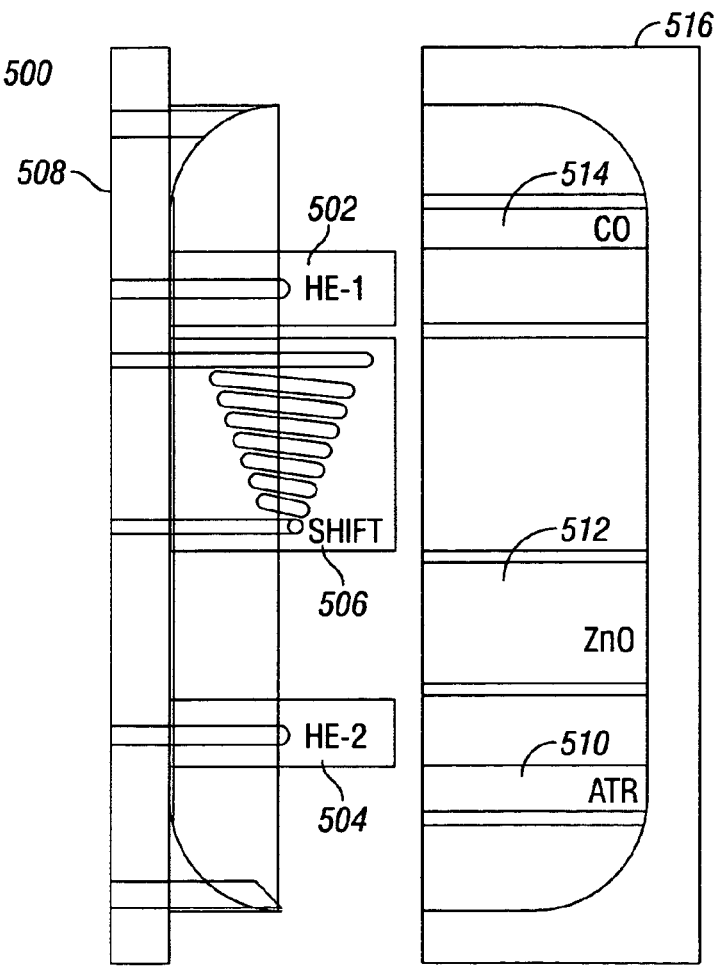

FIG. 5 shows an illustrative embodiment of stacked modules according to the present invention, wherein the modules are enclosed within a single container 500. A feature of such a system is that the more permanent modules are attached to one portion of the container, and the modules that need replacement or maintenance on a regular basis are attached to a second portion of the device. As shown in FIG. 5, the heat exchangers 502, 504 and the water gas shift module 506, that do not necessarily require regular replacement or service, are associated with a first half shell 508 of the container 500. The autothermal reforming module 510, zinc oxide module 512, and carbon monoxide oxidation module 514, which do require regular maintenance or service, are associated with a second half shell 516 of the container 500. In this illustrative embodiment, the two portions of the processor body are designed such that when put together they form seal between each module and form a complete fuel processor.

Such a skilled person in the art should also appreciate that the present invention also encompasses the following illustrative embodiments. One such illustrative embodiment includes an apparatus for converting hydrocarbon fuel into a hydrogen rich gas, including a plurality of modules stacked end-to-end along a common axis, wherein each module includes a shell having an interior space defining a passageway for the flow of a gas stream from a first end of the shell to a second end of the shell opposite the first end, and a processing core contained within the interior space for effecting a chemical, thermal, or physical change to the gas stream passing axially therethrough. In this illustrative embodiment, the plurality of modules includes a first module including an autothermal reforming catalyst bed, a second module positioned adjacent to the first module including a first heat exchanger, a third module positioned adjacent to the second module including a desulfurization catalyst bed (preferably zinc oxide), a fourth module positioned adjacent to the third module including a water gas shift catalyst bed, a fifth module positioned adjacent to the fourth module including a second heat exchanger, and a sixth module positioned adjacent to the fifth module including a preferential oxidation catalyst bed. It is also an aspect of the fuel processor to comprise a manifold, wherein the manifold is positioned adjacent to the sixth module, and wherein the manifold recovers the hydrogen rich gas from the sixth module and distributes coolant to and collects coolant from the second, fourth, and fifth modules. It is a preferred aspect of this illustrative embodiment that the processing core for each module is enclosed by ceramic casting for insulative purposes. Furthermore, it is a preferred embodiment that a third heat exchanger is positioned within the water gas shift catalyst bed in order to adequately control the shift reaction temperature.

Another such illustrative embodiment includes an apparatus for converting hydrocarbon fuel into a hydrogen rich gas, including a container having a feed end and a product end, and a plurality of modules stacked end-to-end along a common axis with the plurality of modules being enclosed within the container. Each module including a shell having an interior space defining a passageway for the flow of a gas stream from a first end of the shell to a second end of the shell opposite the first end, and a processing core contained within the interior space for effecting a chemical, thermal, or physical change to the gas stream passing axially therethrough. In this illustrative embodiment, the plurality of modules includes a first module containing an autothermal/ steam reforming catalyst bed, a second module positioned adjacent to the first module including a first heat exchanger, a third module positioned adjacent to the second module containing a desulfurization catalyst bed (preferably zinc oxide), a fourth module positioned adjacent to the third module containing a water gas shift catalyst bed, a fifth module positioned adjacent to the fourth module including a second heat exchanger, and a sixth module positioned adjacent to the fifth module containing a preferential oxidation catalyst bed. It is a preferred aspect of this illustrative embodiment that the container includes a first portion and a second portion, wherein the first portion is connected to a first set of modules and the second portion is connected to a second set of modules, wherein the first portion and the second portion of the container are separable, thereby permitting either set of modules to be serviced independently.

While the apparatus, compositions and methods of this invention have been described in terms of preferred or illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An apparatus for converting a hydrocarbon fuel into a hydrogen rich gas, comprising:
   a plurality of modules stacked end-to-end along a common axis; wherein
      each module comprises:
         a shell comprising a cylindrical shaped tubular member having an axial bore providing a passageway for the flow of a gas stream from a first end of the shell to a second end of the shell opposite the first end, and
         a processing core contained within the axial bore for effecting a chemical, thermal, or physical change to the gas stream passing axially therethrough; and
   wherein the plurality of modules comprises:
      a first module comprising an autothermal reforming catalyst bed,
      a second module comprising a first heat exchanger,
      a third module comprising a desulfurization catalyst bed,
      a fourth module comprising a water gas shift catalyst bed,
      a fifth module comprising a second heat exchanger, and
      a sixth module comprising a preferential oxidation catalyst bed; and
   a manifold, wherein the manifold is positioned adjacent to the sixth module, and distributes coolant to and collects coolant from the second, fourth, and fifth modules.

2. The apparatus of claim 1, wherein the processing core of each module is enclosed by ceramic casting.

3. The apparatus of claim 1, wherein the fourth module further comprises a third heat exchanger positioned within the water gas shift catalyst bed.

4. The apparatus of claim 3, wherein the third heat exchanger comprises a cooling coil.

5. The apparatus of claim 1, wherein the desulfurization catalyst comprises zinc oxide.

6. The apparatus of claim 1, wherein the water gas shift catalyst bed comprises a low temperature water gas shift catalyst.

7. The apparatus of claim 6, wherein the low temperature water gas shift catalyst is copper, copper oxide, zinc, platinum, rhenium, palladium, rhodium, gold, or combinations thereof.

8. The apparatus of claim 1, wherein the water gas shift catalyst bed comprises a high temperature water gas shift catalyst.

9. The apparatus of claim 8, wherein the high temperature water gas shift catalyst is ferric oxide, chromic oxide, copper, iron silicide, platinum, palladium, or combinations thereof.

10. The apparatus of claim 1, wherein the preferential oxidation catalyst bed comprises a catalyst selected from the group consisting of platinum, palladium, iron, chromium, manganese, iron oxide, chromium oxide, manganese oxide, ruthenium, palladium, gold, and combinations thereof.

11. An apparatus for converting a hydrocarbon fuel into a hydrogen rich gas, comprising:
   a container having a feed end and a product end wherein the container comprises a first portion and a second portion, wherein the first portion is connected to a first set of modules and the second portion is connected to a second set of modules; and
   a plurality of modules stacked end-to-end along a common axis, the plurality of modules being enclosed within the container;
   wherein each module comprises:
      a shell having an interior space defining a passageway for the flow of a gas stream from a first end of the shell to a second end of the shell opposite the first end, and
      a processing core contained within the interior space for effecting a chemical, thermal, or physical change to the gas stream passing axially therethrough; and
   wherein the plurality of modules comprises:
      a first module comprising an autothermal reforming catalyst bed,
      a second module comprising a first heat exchanger,
      a third module comprising a desulfurization catalyst bed,
      a fourth module comprising a water gas shift catalyst bed,
      a fifth module comprising a second heat exchanger, and
      a sixth module comprising a preferential oxidation catalyst bed.

12. The apparatus of claim 11, wherein the first set of modules comprises the second, fourth, and fifth modules.

13. The apparatus of claim 11, wherein the second set of modules comprises the first, third, and sixth modules.

14. The apparatus of claim 11, wherein the first portion and the second portion of the container are separable, thereby permitting either set of modules to be serviced independently.

* * * * *